US007795848B2

(12) United States Patent
Aiura et al.

(10) Patent No.: US 7,795,848 B2
(45) Date of Patent: Sep. 14, 2010

(54) METHOD AND CIRCUIT FOR GENERATING OUTPUT VOLTAGES FROM INPUT VOLTAGE

(75) Inventors: Masami Aiura, Sendai (JP); Satoshi Takahashi, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 707 days.

(21) Appl. No.: 11/746,071

(22) Filed: May 9, 2007

(65) Prior Publication Data

US 2008/0278124 A1 Nov. 13, 2008

(51) Int. Cl.

| | |
|---|---|
| ***G05F 1/00*** | (2006.01) |
| ***H02J 1/10*** | (2006.01) |
| ***H02J 3/00*** | (2006.01) |
| ***H02J 3/14*** | (2006.01) |
| ***H02M 1/10*** | (2006.01) |

(52) U.S. Cl. ........................................ 323/269; 307/29

(58) Field of Classification Search ................... 363/49, 363/21.18; 323/266–272; 307/29, 31, 34, 307/39

See application file for complete search history.

(56) References Cited

U.S. PATENT DOCUMENTS

| | | | | |
|---|---|---|---|---|
| 5,459,652 | A * | 10/1995 | Faulk | 363/49 |
| 6,687,166 | B1 | 2/2004 | Takahashi et al. | |
| 6,879,501 | B2 * | 4/2005 | Mori | 363/21.18 |
| 2003/0235101 | A1 | 12/2003 | Tanaka et al. | |

FOREIGN PATENT DOCUMENTS

| | | |
|---|---|---|
| JP | 2006320060 A | 11/2006 |

* cited by examiner

*Primary Examiner*—Bao Q Vu
*Assistant Examiner*—Jue Zhang
(74) *Attorney, Agent, or Firm*—Charles Bergere

(57) ABSTRACT

A power supply circuit that accurately generates output voltages with the same regulator includes a regulator for generating a first output voltage from an input voltage. A first switch circuit, connected to the regulator, selectively outputs the first output voltage of the regulator as a second output voltage from the power supply circuit. A pre-charge circuit, connected to the regulator and the first switch circuit, generates the second output voltage from the input voltage before the first output voltage of the regulator is output as the second output voltage while controlling the first switch circuit.

7 Claims, 2 Drawing Sheets

METHOD AND CIRCUIT FOR GENERATING OUTPUT VOLTAGES FROM INPUT VOLTAGE

BACKGROUND OF THE INVENTION

The present invention relates to a power supply circuit, and more particularly, to a method and a circuit for generating a plurality of output voltages from an input voltage with a single regulator.

Japanese Laid-Open Patent Publication No. 2006-320060 describes an example of a power supply circuit including at least two power supply output units, such as series regulators, and generating two power supply outputs.

FIG. 1 is a schematic circuit diagram of a conventional power supply circuit 100 having the structure described in the above publication and including a plurality of regulators. The power supply circuit 100 of FIG. 1 includes first and second regulators 110 and 120 and first and second trim circuits 112 and 122 for adjusting outputs of the first and second regulators 110 and 120.

The first regulator 110 is connected to an input terminal 130 and a first output terminal 132. A capacitor C1 is connected to the first output terminal 132. The second regulator 120 is connected to the input terminal 130 and a second output terminal 134. A capacitor C2 is connected to the second output terminal 134. The input terminal 130 is connected to a power supply 140 and a capacitor C0. The power supply 140 supplies an input voltage VIN to the first and second regulators 110 and 120 via the input terminal 130. The capacitor C0 prevents the input voltage VIN from fluctuating. The capacitors C1 and C2 prevent the first and second output voltages OUT1 and OUT2 from fluctuating due to a load such as an internal circuit (not shown). The second regulator 120 is provided with a control signal S1.

The power supply circuit 100 generates first and second output voltages OUT1 and OUT2, which have the same level, from the input voltage VIN with the two regulators 110 and 120. The power supply circuit 100 generates only the first output voltage OUT1 with the first regulator 110 when the control signal S1 is a disable signal (i.e., the second regulator 120 being inactivated). The power supply circuit 100 generates the first and second output voltages OUT1 and OUT2 at the same level with the first and second regulators 110 and 120 when the control signal S1 is an enable signal (i.e., the second regulator 120 is activated).

FIG. 2 is a schematic circuit diagram of another conventional power supply circuit 200. The power supply circuit 200 of FIG. 2 includes a regulator 210, a trim circuit 212 for adjusting an output of the regulator 210, and a switch circuit SW100. The power supply circuit 200 includes the switch circuit SW100 in lieu of the second regulator 120 and the second trim circuit 122 of the power supply circuit 100 of FIG. 1. The remaining parts of the power supply circuit 200 are the same as the power supply circuit 100 of FIG. 1.

The switch circuit SW100 has a first contact, which is connected to an output terminal of the regulator 210 and a first output terminal 132, and a second contact, which is connected to a second output terminal 134. The switch circuit SW100 is provided with a control signal S2.

The power supply circuit 200 generates first and second output voltages OUT1 and OUT2 having the same level from an input voltage VIN using the single regulator 210. More specifically, the power supply circuit 200 generates only the first output voltage OUT1 when the control signal S2 is a disable signal (i.e., the switch circuit SW100 is inactivated). Further, the power supply circuit 200 generates the first and second output voltages OUT1 and OUT2 when the control signal S2 is an enable signal (i.e., the switch circuit SW100 is activated).

The conventional power supply circuits 100 and 200 have the shortcomings described below.

The power supply circuit 100 shown in FIG. 1 needs to include the two regulators 110 and 120. This increases the circuit scale and cost of the power supply circuit 100. Further, the power supply circuit 100 generates the two output voltages OUT1 and OUT2 from two separate regulators 110 and 120. This causes difficulty in accurately maintaining the two output voltages OUT1 and OUT2 at the same level.

The power supply circuit 200 shown in FIG. 2 generates the two output voltages OUT1 and OUT2 with the same regulator 210. Thus, the power supply circuit 200 is smaller in size than the power supply circuit 100 shown in FIG. 1. However, the first output voltage OUT1 of the power supply circuit 200 instantaneously falls when the switch circuit SW100 goes on.

FIG. 3 is a waveform diagram showing the two output voltages OUT1 and OUT2 of the power supply circuit 200 of FIG. 2. As shown in FIG. 3, the control signal S2 rises to a high (H) level at time t1 to activate the switch circuit SW100. As a result, an output voltage of the regulator 210 increases the second output voltage OUT2. Referring to FIG. 2, this forms a current path P1 between the capacitors C1 and C2 via the first output terminal 132, the switch circuit SW100, and the second output terminal 134. Charge accumulated in the capacitor C1 flows into the capacitor C2 through the current path P1. As a result, the first output voltage OUT1 falls instantaneously as indicated by arrow A in FIG. 3. In this manner, the power supply circuit 200 of FIG. 2 cannot accurately maintain the two output voltages OUT1 and OUT2 at the same level.

It would be advantageous to have a circuit and a method for accurately generating a plurality of output voltages from an input voltage with a single regulator.

SUMMARY OF THE INVENTION

One aspect of the present invention is a power supply circuit for receiving an input voltage and generating a first output voltage and a second output voltage. The power supply circuit includes a regulator for generating the first output voltage from the input voltage. A first switch circuit, connected to the regulator, selectively outputs the first output voltage of the regulator as the second output voltage. A precharge circuit, connected to the regulator and the first switch circuit, generates the second output voltage from the input voltage before the first output voltage of the regulator is output as the second output voltage while controlling the first switch circuit.

Another aspect of the present invention is a power supply circuit for receiving an input voltage and generating a first output voltage and a second output voltage. The power supply circuit includes a regulator for generating the first output voltage from the input voltage. A first switch circuit, connected to the regulator, selectively outputs the first output voltage of the regulator as the second output voltage from the power supply circuit. A second switch circuit, connected to the first switch circuit, selectively outputs the input voltage as the second output voltage from the power supply circuit. A comparator, connected to the regulator and the second switch circuit, compares the first output voltage and the second output voltage and generates a determination signal in accordance with the result of the comparison. A logic circuit, which is connected to the comparator, the first switch circuit, and the second switch circuit, controls the first and second switch circuits using the determination signal of the comparator.

A further aspect of the present invention is a method for generating a first output voltage and a second output voltage from an input voltage with a power supply circuit including a regulator. The method includes generating the first output voltage from the input voltage with the regulator, outputting the first output voltage of the regulator as the second output voltage from the power supply circuit, and generating the second output voltage from the input voltage before outputting the first output voltage of the regulator as the second output voltage.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A power supply circuit 10 according to an embodiment of the present invention will now be described with reference to FIGS. 4 and 5.

Figure 4:
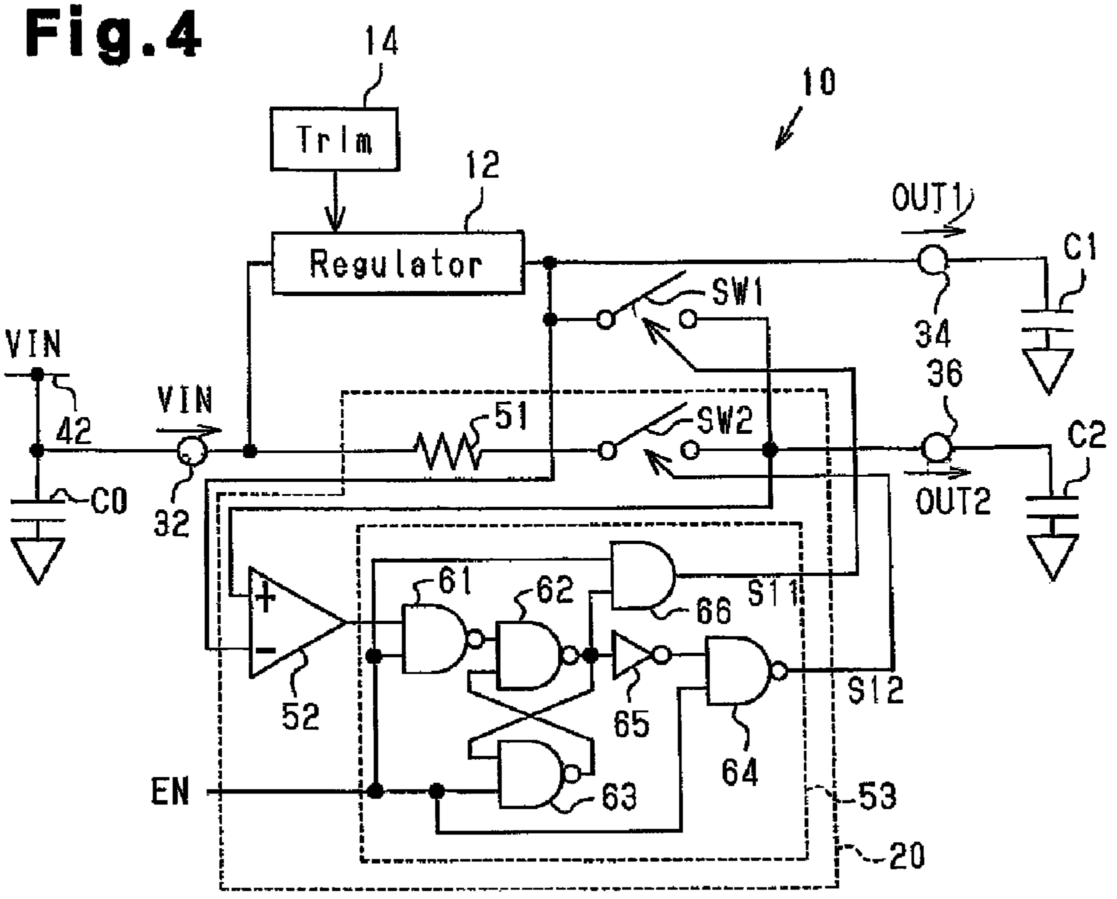
FIG. 4 is a schematic circuit diagram of a power supply circuit according to an embodiment of the present invention.

FIG. 4 is a schematic circuit diagram of the power supply circuit 10 according to an embodiment of the present invention. FIG. 5 is a waveform diagram showing the operation of the power supply circuit 10 of FIG. 4 and two output voltages generated by the power supply circuit 10.

The power supply circuit 10 includes a regulator 12, a trim circuit 14, a first switch circuit SW1, and a pre-charge circuit 20. The regulator 12 is connected to an input terminal 32 and a first output terminal 34. A power supply 42 and a capacitor C0 are connected to the input terminal 32. The power supply 42 supplies the regulator 12 with an input voltage VIN via the input terminal 32. A capacitor C1 is connected to the first output terminal 34.

The regulator 12 generates an output voltage from the input voltage VIN, and supplies the output voltage to a load such as an internal circuit (not shown) via the first output terminal 34. In this specification, the output voltage generated by the regulator 12 and supplied to the first output terminal 34 is referred to as a first output voltage OUT1. The capacitor C1 prevents the first output voltage OUT1 from fluctuating due to a load connected to the first output terminal 34. The regulator 12 is further connected to the trim circuit 14. The trim circuit 14 adjusts a reference voltage (not shown) of the regulator 12 to keep the output voltage of the regulator 12 constant.

The first switch circuit SW1 has a first contact connected to the regulator 12 and a second contact connected to a second output terminal 36. A capacitor C2 is connected to the second output terminal 36. The first switch circuit SW1 preferably is formed by one or more transistors. The first switch circuit SW1, which also is connected to the pre-charge circuit 20, receives a first control signal S11 generated by the pre-charge circuit 20. In one embodiment, the first switch circuit SW1 is activated in response to a high (H) level first control signal S11 and inactivated in response to a low (L) level first control signal S11.

When the first switch circuit SW1 is activated in response to the first control signal S11, an output terminal of the regulator 12 is connected to the second output terminal 36 so that an output voltage of the regulator 12 is supplied to a load via the second output terminal 36. In this specification, the output voltage generated at the second output terminal 36 is referred to as a second output voltage OUT2. The capacitor C2 prevents the second output voltage OUT2 from fluctuating due to a load connected to the second output terminal 36.

The pre-charge circuit 20 is connected to the input terminal 32, the second output terminal 36, the regulator 12, and the first switch circuit SW1. The pre-charge circuit 20 is provided with an enable signal EN from an external device (not shown). The pre-charge circuit 20 has a pre-charge function for forming a pre-charge path in response to the enable signal EN and directly generating the second output voltage OUT2 from the input voltage VIN.

Figure 2:
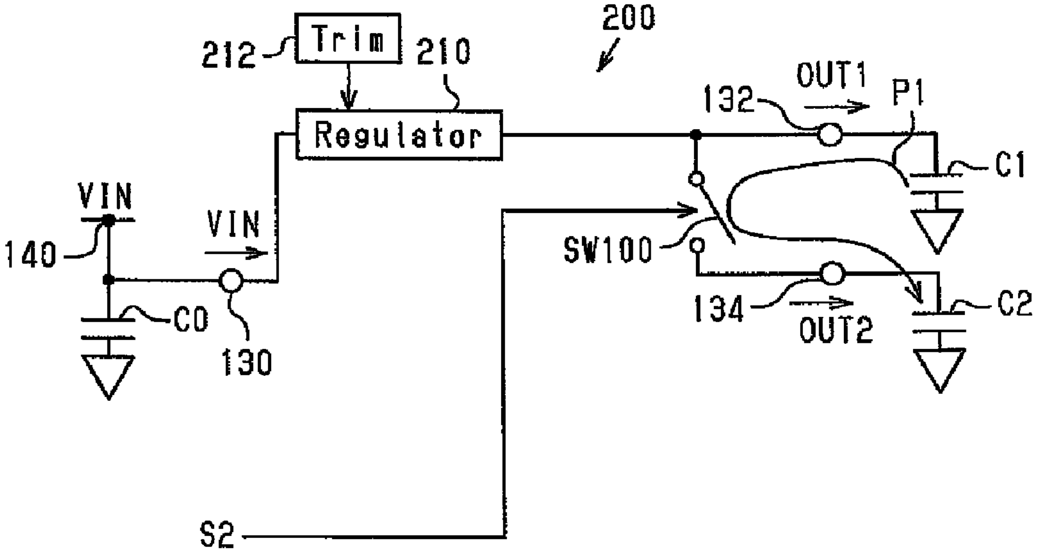
Fig.2 (Prior Art)
FIG. 2 is a schematic circuit diagram of another conventional power supply circuit.
Figure 3:
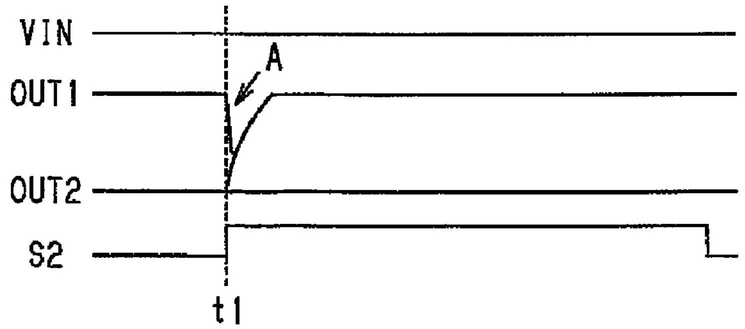
Fig.3 (Prior Art)
FIG. 3 is a waveform diagram showing the operation of the power supply circuit show in FIG. 2 and two output voltages generated by the power supply circuit.

Due to the pre-charge function, the pre-charge circuit 20 generates the second output voltage OUT2 without using the regulator 12. More specifically, the pre-charge circuit 20 performs a pre-charge operation to raise the second output voltage OUT2 to substantially the same level as the first output voltage OUT1, which is generated by the regulator 12. During the pre-charge operation, the pre-charge circuit 20 generates the first control signal S11 at an L level to inactivate the first switch circuit SW1. This disconnects the output terminal of the regulator 12 from the second output terminal 36. Accordingly, the current path P1 shown in FIG. 2 is not formed when the pre-charge operation is performed.

The pre-charge circuit 20 first raises the second output voltage OUT2 to the same level as the first output voltage OUT1 during the pre-charge operation. Then, the pre-charge circuit 20 stops the pre-charge operation. More specifically, the pre-charge circuit 20 disconnects the pre-charge path. Subsequently, the pre-charge circuit 20 raises the first control signal S11 to an H level to activate the first switch circuit SW1 at substantially the same timing as when the pre-charge operation is stopped. As a result, after the pre-charge operation, the second output voltage OUT2 is supplied from the regulator 12.

The structure of the pre-charge circuit 20 will now be described in detail.

The pre-charge circuit 20 includes a current control circuit 51, a comparator 52, a logic circuit 53, and a second switch circuit SW2. The logic circuit 53 includes first to fourth NAND gates 61 to 64, an inverter 65, and an AND gate 66.

In the embodiment shown, the current control circuit 51 is formed by a resistor, which has a first terminal connected to the input terminal 32. The second switch circuit SW2, which is preferably formed by one or more transistors, has a first contact connected to a second terminal of the resistor (current control circuit 51) and a second contact connected to a non-inversion input terminal of the comparator 52 and the second output terminal 36.

The second switch circuit SW2 is provided with a second control signal S12 generated by the logic circuit 53. The second switch circuit SW2 of the preferred embodiment is activated in response to an H level second control signal S12, which is provided from the logic circuit 53, and inactivated in response to an L level second control signal S12, which is provided from the logic circuit 53. The current control circuit 51 and the second switch circuit SW2 between the input terminal 32 and the second output terminal 36 form a pre-charge path. When the pre-charge operation starts, the current control circuit 51, or the resistor, restricts the flow of a large current that exceeds the breakdown voltage through the second switch circuit SW2 to prevent the second switch circuit SW2 from being damaged.

An inverted input terminal of the comparator 52 is connected to the output terminal of the regulator 12. During the pre-charge operation, the comparator 52 compares the output voltage of the regulator 12 (i.e., the first output voltage OUT1) supplied to its inverted input terminal with the second output voltage OUT2 supplied to its non-inverted input terminal to generate a determination signal indicating the comparison result. More specifically, the comparator 52 generates an L level determination signal when the second output voltage OUT2 is lower than the first output voltage OUT1 and generates an H level determination signal when the second output voltage OUT2 has a level that is higher than the first output voltage OUT1.

The first NAND gate 61 has a first input terminal for receiving the determination signal of the comparator 52, a second input terminal for receiving the enable signal EN, and an output terminal. The second NAND gate 62 has a first input terminal connected to the output terminal of the first NAND gate 61, a second input terminal, and an output terminal. The third NAND gate 63 has a first input terminal connected to the output terminal of the second NAND gate 62, a second input terminal for receiving the enable signal EN, and an output terminal connected to the second input terminal of the second NAND gate 62. The second NAND gate 62 and the third NAND gate 63 form a latch circuit.

The inverter 65 has an input terminal connected to an output terminal of the second NAND gate 62, or to an output terminal of the latch circuit, and an output terminal. The inverter 65 inverts an output signal of the latch circuit.

The AND gate 66 has a first input terminal for receiving the enable signal EN, a second input terminal connected to the output terminal of the latch circuit, and an output terminal connected to the first switch circuit SW1. The AND gate 66 generates the first control signal S11 based on the enable signal EN and an output signal of the latch circuit.

The fourth NAND gate 64 has a first input terminal connected to an output terminal of the inverter 65, a second input terminal for receiving the enable signal EN, and an output terminal connected to the second switch circuit SW2. The fourth NAND gate 64 generates the second control signal S12 based on an output signal of the inverter 65 and the enable signal EN.

The operation of the pre-charge circuit 20 will now be described.

In an initial state, the power supply circuit 10 supplies the first output voltage OUT1 generated by the regulator 12 to the load. The second output voltage OUT2 is 0 V. Referring to FIG. 5, in the initial state, the first and second control signals S11 and S12 of the pre-charge circuit 20 are each maintained at an L level based on an L level latch signal, which corresponds to a logic value of "0" held by the latch circuit, and an L level enable signal EN. As a result, the first and second switch circuits SW1 and SW2 are both inactivated.

When the pre-charge circuit 20 is provided with an H level enable signal EN in the initial state, the pre-charge circuit 20 starts the pre-charge operation. In detail, the pre-charge circuit 20 generates an H level second control signal S12 to activate the second switch circuit SW2. In this state, the first control signal S11 is still at an L level.

When the second switch circuit SW2 is turned on in response to the second control signal S12, the pre-charge path is activated. More specifically, the second output terminal 36 is electrically connected to the input terminal 32 via the second switch circuit SW2 and the current control circuit 51 (resistor). As a result, the input voltage VIN is directly supplied from the power supply 42 to the second output terminal 36 via the second switch circuit SW2. During the pre-charge operation, the current control circuit 51 restricts the amount of current flowing through the second switch circuit SW2 as described above. As a result, the second output voltage OUT2 increases smoothly as shown in FIG. 5.

The comparator 52 compares the first output voltage OUT1, which is the output voltage of the regulator 12, and the second output voltage OUT2, which is output to the second output terminal 36 via the second switch circuit SW2 (i.e., the pre-charge path), to generate a determination signal in accordance with the comparison result.

Figure 5:
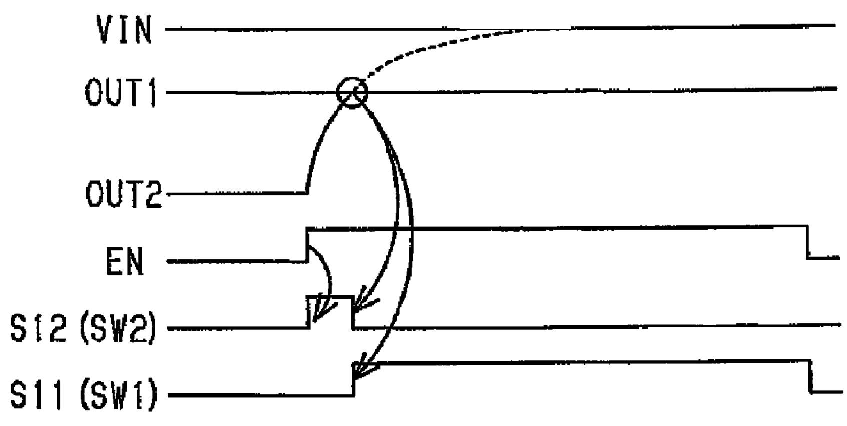
FIG. 5 is a waveform diagram showing the operation of the power supply circuit of FIG. 4 and two output voltages generated by the power supply circuit.

As shown in FIG. 5, when the second output voltage OUT2 is lower than the first output voltage OUT1, the first switch circuit SW1 remains off, and the second switch circuit SW2 remains on. Thus, the pre-charge operation continues. During the pre-charge operation, the comparator 52 generates an L level determination signal, and the latch circuit of the logic circuit 53 holds a logic value of "0" corresponding to an L level. This maintains each of the switch circuits Sw1 and SW2 in the same state. Thus, when the second output voltage OUT2 is lower than the first output voltage OUT1, the current path P1 shown in FIG. 2 is not formed between the capacitors C1 and C2.

When the second output voltage OUT2 reaches the same level as the first output voltage OUT1, the comparator 52 generates an H level determination signal. As a result, the first control signal S11 of the AND gate 66 rises to an H level, and the second control signal S12 of the fourth NAND gate 64 falls to an L level. This activates the first switch circuit SW1 and connects the output terminal of the regulator 12 to the second output terminal 36. Further, the second switch circuit SW2 is inactivated at the same time as when the first switch circuit SW1 is activated to inactivate the pre-charge path. As a result, as shown in FIG. 5, after the second output voltage OUT2 reaches the same level as the first output voltage OUT1 due to the pre-charge operation, the second output voltage OUT2 keeps the same level as the first output voltage OUT1 generated by the regulator 12.

In the power supply circuit 10 of the preferred embodiment, the first switch circuit SW1 is activated after the second output voltage OUT2 reaches the same level as the first output voltage OUT1. Thus, when the first switch circuit SW1 is activated, the capacitors C1 and C2 have been charged to substantially the same level. Thus, the charges of capacitors C1 and C2 are not shared. This prevents the first output voltage OUT1 from decreasing.

After the pre-charge operation, the state of each of the switch circuits SW1 and SW2 is maintained by the latch circuit. The latch circuit holds a logic value of "1" corresponding to an H level after the pre-charge operation. Thus, the levels of the first and second control signals S11 and S12 do not change even when relative fluctuation of the first and second output voltages OUT1 and OUT2 changes the output level of the comparator 52. Since the switch circuits SW1 and SW2 are not switched, the second output voltage OUT2 does not increase after the pre-charge operation.

The power supply circuit 10 of the present invention has the following advantages. The power supply circuit 10 first raises the second output voltage OUT2 to the same level as the first output voltage OUT1 through the pre-charge operation. Then, the power supply circuit 10 switches the second output voltage OUT2 to the output voltage of the regulator 12. The regulator 12 is not used when the second output voltage OUT2 rises. This prevents the first output voltage OUT1 from decreasing since charges are not shared between the capacitors C1 and C2.

The input voltage VIN is higher than the first and second output voltages OUT1 and OUT2 generated by the regulator 12. Accordingly, the second output voltage OUT2 is directly generated from the input power supply VIN during the pre-charge operation so that the second output voltage OUT2 rises earlier than when using the power supply circuit 200 of FIG. 2.

Figure 1:
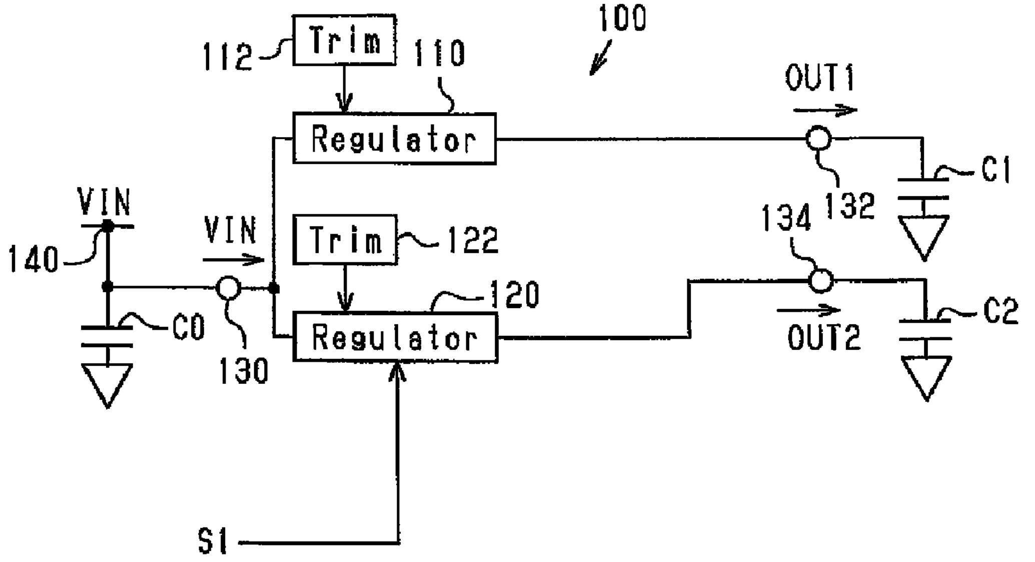
Fig.1 (Prior Art)
FIG. 1 is a schematic circuit diagram of a conventional power supply circuit.

The two output voltages OUT1 and OUT2 are generated by the same regulator 12. This reduces the circuit scale and cost of the power supply circuit 10 as compared with the power supply circuit 100 of FIG. 1. Further, the first and second output voltages OUT1 and OUT2 are maintained at the same level accurately and more easily compared to when using the separate regulators 110 and 120 shown in FIG. 1.

The current control circuit 51 is arranged in the pre-charge path. This restricts the flow of a large current that exceeds the breakdown voltage through the second switch circuit SW2 and prevents the second switch circuit SW2 from being damaged.

The pre-charge circuit 20 includes the latch circuit. This prevents the switch circuits SW1 and SW2 from switching after the pre-charge operation and increasing the second output voltage OUT2.

It should be apparent to those skilled in the art that the present invention may be embodied in many other specific forms without departing from the spirit or scope of the invention. Particularly, it should be understood that the present invention may be embodied in the following forms.

Instead of using a resistor, the current control circuit 51 may use a current mirror circuit or an active load formed by a transistor.

The current control circuit 51 may be arranged between the second switch circuit SW2 and the second output terminal 36. In this case, it is preferred that the current control circuit 51 be arranged between the second contact of the first switch circuit SW1 and the second contact of the second switch circuit SW2.

The logic circuit 53 of the pre-charge circuit 20 is not limited to the structure shown in FIG. 4.

The comparator 52 may use another reference voltage instead of the first output voltage OUT1. In this case, it is preferred that the reference voltage is set substantially at the same level as the first output voltage OUT1 generated by the regulator 12.

The present invention may generate three or more output voltages that are the same from the input voltage VIN. To generate three output voltages, for example, the power supply circuit may generate a first output voltage with a regulator and second and third output voltages with the regulator and the pre-charge function.

The present examples and embodiments are to be considered as illustrative and not restrictive, and the invention is not to be limited to the details given herein, but may be modified within the scope and equivalence of the appended claims.

What is claimed is:

1. A power supply circuit for receiving an input voltage and generating a first output voltage and a second output voltage, the power supply circuit comprising:

a regulator for generating the first output voltage from the input voltage;

a first switch circuit, connected to the regulator, for selectively outputting the first output voltage as the second output voltage; and a pre-charge circuit, connected to the regulator and the first switch circuit, for generating the second output voltage from the input voltage before the first output voltage is output as the second output voltage while controlling the first switch circuit, wherein the pre-charge circuit includes, a pre-charge path for outputting the input voltage as the second output voltage, a second switch circuit arranged in the pre-charge path for selectively activating the pre-charge path, and a logic circuit, activated by an enable signal, for generating first and second control signals that activate and inactivate the first and second switch circuits in a complementary manner, and wherein the second switch is activated in response to the enable signal and deactivated in response to the second control signal after the second output voltage reaches a level that is substantially the same as the first output voltage.

2. The power supply circuit of claim 1, wherein the pre-charge circuit further includes a current control circuit arranged on the pre-charge path for restricting current flowing through the pre-charge path.

3. The power supply circuit of claim 2, wherein the current control circuit includes a resistor.

4. The power supply circuit of claim 2, wherein:

the regulator has an input terminal for receiving the input voltage and an output terminal for outputting the first output voltage;

the first switch circuit has a first contact, connected to the output terminal of the regulator, and a second contact; and the current control circuit is arranged between the input terminal of the regulator and the second contact of the first switch circuit.

5. The power supply circuit of claim 1, wherein:

the pre-charge circuit further includes a comparator for comparing the first output voltage and the second output voltage and generating a determination signal indicating the result of the comparison; and the logic circuit generates the first and second control signals using the determination signal and the enable signal.

6. The power supply circuit of claim 5, wherein the logic circuit includes a latch circuit for holding the state of each of the first and second control signals using the determination signal of the comparator and the enable signal.

7. A power supply circuit for receiving an input voltage and generating a first output voltage and a second output voltage, the power supply circuit comprising:

a regulator for generating the first output voltage from the input voltage;

a first switch circuit, connected to the regulator, for selectively outputting the first output voltage of the regulator as the second output voltage from the power supply circuit;

a second switch circuit, connected to the first switch circuit, for selectively outputting the input voltage as the second output voltage from the power supply circuit;

a comparator, connected to the regulator and the second switch circuit, for comparing the first output voltage and the second output voltage and generating a determination signal in accordance with the result of the comparison; and a logic circuit, connected to the comparator, the first switch circuit, and the second switch circuit, for controlling the first and second switch circuits using the determination signal of the comparator.

* * * * *